Aug. 19, 1947.   T. L. WEYBREW   2,426,075
CONTROL SYSTEM FOR SERIES-PARALLEL MOTOR OPERATION
Filed Sept. 7, 1945

WITNESSES:

INVENTOR
Thelbert L. Weybrew.
BY
ATTORNEY

Patented Aug. 19, 1947

2,426,075

UNITED STATES PATENT OFFICE 2,426,075

CONTROL SYSTEM FOR SERIES-PARALLEL MOTOR OPERATION

Thelbert L. Weybrew, Pittsburgh, Pa., assignor to Westinghouse Electric Corporation, East Pittsburgh, Pa., a corporation of Pennsylvania Application September 7, 1945, Serial No. 614,951

7 Claims. (Cl. 172—239)

My invention relates, generally, to control systems and, more particularly, to systems for controlling the operation of Diesel-electric locomotives and the like.

The main generators on Diesel-electric locomotives are sometimes so designed that it is desirable to provide protection against overloads in addition to the protection afforded by the ability of the locomotive to slip its wheels before an overload becomes dangerous. An overload is most likely to occur after the locomotive equipment has automatically transferred from series to parallel motor connections and is caused by encountering a grade which so reduces the locomotive speed that the series type motors draw a large current from the generator. Such an overload is normally relieved by a reverse transition to the series motor connections to reduce the current load on the generator.

In previously known systems, the reverse transition is initiated either by a voltage relay connected across the main generator armature or by a current relay having its actuating coil connected in the circuit between the generator armature and the traction motors. The voltage relay scheme is not entirely satisfactory in systems having a differential exciter because the main generator voltage characteristic is dependent on maintaining proper engine speed. The series current relay scheme is objectionable in that it requires a heavy strap coil and requires changing of the heavy cable circuits of the locomotive. The operation of both schemes depends entirely on the electrical conditions of the generator without regard to its temperature, thus protecting a cold generator from an overload current just as much as a hot generator.

An object of my invention, generally stated, is to provide a system for automatically controlling the transition of electric motors which shall be simple and efficient in operation and which may be economically manufactured and installed.

A more specific object of my invention is to provide adequate overload protection for the generator which supplies current to the motors of a locomotive without overprotecting the generator.

Another object of my invention is to provide an overload protective system in which the protection is varied in proportion to the needs of the machine being protected.

Other objects of my invention will be explained fully hereinafter or will be apparent to those skilled in the art.

In accordance with one embodiment of my invention, the transition of the motors of a locomotive from series to parallel-circuit relation and from parallel to series-circuit relation is controlled by a relay of the voltage type having its actuating coil connected in parallel-circuit relation to the commutating field winding of the generator which supplies current to the motors. Thus, the relay causes reverse transition of the motors at a lower generator current when the machine is hot than when it is cold and the protective action of the relay is varied in proportion to the needs of the generator.

For a fuller understanding of the nature and objects of my invention, reference may be had to the following detailed description, taken in conjunction with the accompanying drawing, in which.

Figures 1, 2:
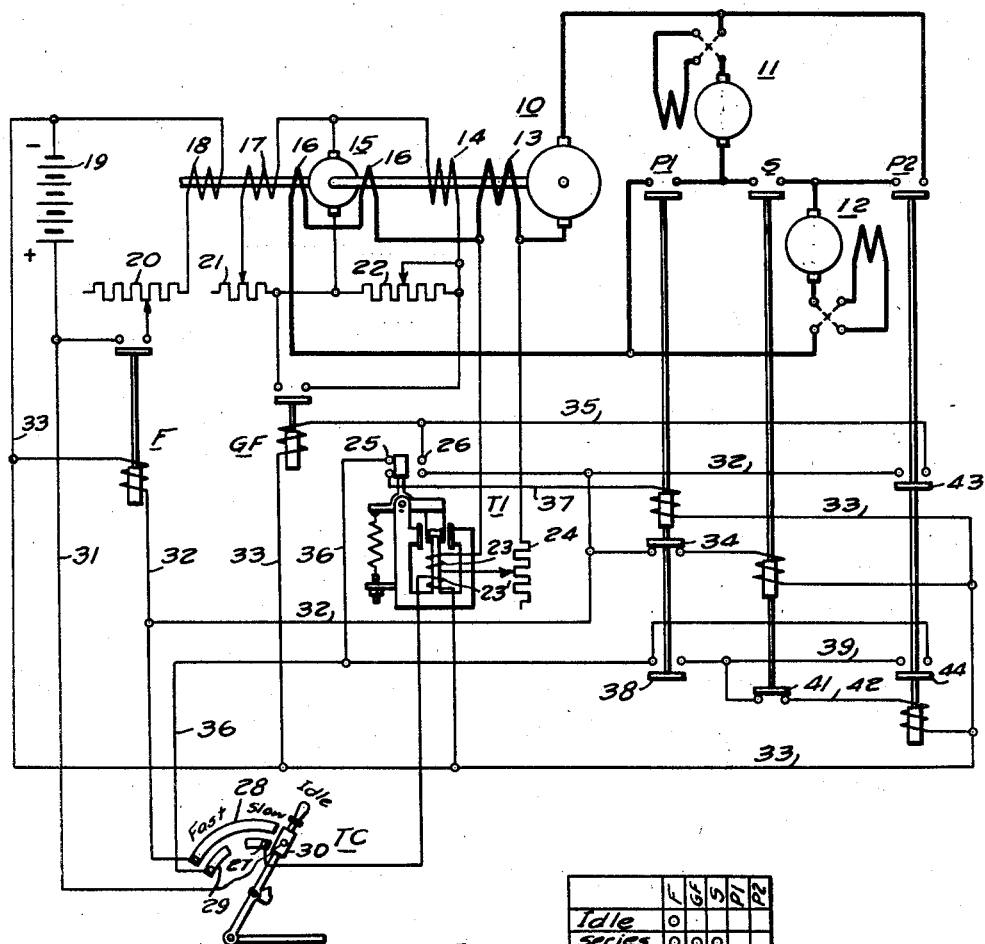
Figure 1 is a diagrammatic view of a control system embodying my invention.
Fig. 2 is a chart showing the sequence of operation of certain of the switches illustrated in Fig. 1.

Referring to the drawing, the system shown therein comprises a generator 10 for supplying current to a plurality of motors 11 and 12, which are of a type suitable for propelling a locomotive or other vehicle. The generator 10 is provided with a commutating field winding 13, and a separately excited field winding 14 which is energized by an exciter 15. The exciter 15 is preferably of the differential type and is provided with differential series field windings 16, a shunt field winding 17, and a separately excited field winding 18 which is energized from a battery 19. Both the generator 10 and the exciter 15 may be driven by an internal combustion engine or other suitable prime mover (not shown).

A switch F is provided for connecting the field winding 18 across the battery 19, and a variable resistor 20 is provided for adjusting the current permitted to flow through the field winding 18. A variable resistor 21 is provided for adjusting the excitation current in the field winding 17 of the exciter 15, and a variable resistor 22 is provided for adjusting the excitation current in the field winding 14 of the generator 10. A switch GF is provided for shunting the resistor 22 from the circuit for the field winding 14 during most of the operating cycle, as will be explained more fully hereinafter.

In accordance with common practice, in Diesel-electric locomotives, a switch S is provided for connecting the motors 11 and 12 in series-circuit relation during starting of the train hauled by the locomotive. Additional switches P1 and P2 are provided for connecting the motors in parallel-circuit relation when the locomotive attains a predetermined speed.

In order that the transition from series to parallel-circuit relation may be automatically effected when the locomotive is operating at the proper speed, a relay T1 is provided for initiating the operation of the transition switches. The relay T1 is provided with an actuating coil 23, which is connected in parallel-circuit relation to the commutating field winding 13 of the generator 10. A variable resistor 24 may be provided for calibrating the relay T1 in accordance with the characteristics of the generator. Since the coil 23 of the relay T1 carries only a small portion of the main generator armature circuit, it will require only small wire instead of the heavy cable needed to carry all the generator armature circuit as in previous installations utilizing current relays for controlling the transition of the motors. The relay T1 is also provided with a pick-up coil 23 which is energized from the battery 19 during starting of the locomotive, as will be explained more fully hereinafter.

In order that the transition from parallel to series-circuit relation may also be automatically controlled, the relay T1 is provided with two sets of contact members 25 and 26, which cooperate with interlock members carried by the transition switches to so control the operation of these switches that the motor connections are changed from parallel back to series-circuit relation in case the speed of the locomotive falls below the normal speed for parallel operation.

It will be understood that the generator current increases when the speed of the locomotive and of the motors 11 and 12 decreases. Thus, the reverse transition takes place when the generator current exceeds a predetermined amount. However, as explained hereinbefore, the relay T1 functions to cause reverse transition at a lower generator armature current if the machine, and hence its commutating field winding, is hot. This advantage results from the parallel connection of the commutating field winding and the relay coil. If the copper field winding is hot, its resistance will be relatively high. Therefore, less current will be required through the field winding to obtain the voltage necessary to operate the relay. Conversely, more current will be required when the commutating field winding 13 is cold. The difference in current will be as much as 30% for the operating temperatures observed on commutating field windings.

Therefore, the protective action of the relay will be varied in proportion to the needs of the generator. The present system also has the additional advantage of eliminating a number of reverse transition operations, since many grades encountered during the operation of a locomotive can be passed over in a few minutes before the temperature of the generator has reached a danger point. The time required to heat the generator is long compared to the time spent on most grades, but protection must be provided for grades of abnormal length and for the various train loads.

A throttle controller TC of the usual type is provided for controlling the governor setting or the supply of fuel to the engine which drives the generator 10 and exciter 15. The controller TC is provided with contact segments 27, 28 and 29, which are engaged by a contact member 30 when the controller is actuated to various operating positions, as will be explained more fully hereinafter.

In order that the functioning of the foregoing apparatus may be more clearly understood, the operation of the system will now be described in more detail. Assuming that the generator 10 and exciter 15 are being rotated by the engine and that it is desired to apply power to the motors 11 and 12 to start the locomotive, the throttle controller TC is actuated from the idling position to the slow-speed position, thereby increasing the speed of the engine which drives the generator 10 and exciter 15.

As indicated by the sequence chart in Fig. 2, when the controller TC is actuated to the slow-speed position, the switches F and GF are closed to energize the field windings 18 and 14 of the exciter 15 and the generator 10, respectively. At this time, the switch S is closed to connect the motors 11 and 12 across the generator 10 in series-circuit relation.

The energizing circuit for the actuating coil of the switch F may be traced from the positive terminal of the battery 19 through conductor 31, the contact members 28 and 30 of the controller TC, conductor 32, the actuating coil of the switch F and conductor 33 to the negative terminal of the battery 19. The energizing circuit for the switch S extends from the conductor 32 through an interlock 34 on the switch P1, the actuating coil of the switch S and the conductor 33 to negative. The energizing circuit for the switch GF extends from the conductor 32 through the contact members 26 of the relay T1, conductor 35 and the actuating coil of the switch GF to negative. It will be understood that the contact members 26 of the relay T1 are closed at this time since the pick-up coil 23' is connected across the battery 19 through contact members 27 and 30 on the controller TC.

If it is desired to increase the speed of the locomotive, the throttle controller TC is actuated to the "fast" position, thereby deenergizing the segment 27 and the pick-up coil 23' on the relay T1. However, the contact members 26 are held closed by the coil 23, the energization of which depends on the motor current. As explained hereinbefore, the current drawn by the motors 11 and 12 decreases as their speed increases. Thus, when the current has decreased sufficiently to permit the relay T1 to open its contact members 26 and close its contact members 25, the transition from series to parallel is effected by the closing of the switch P1, the opening of the switch S and the closing of the switch P2. The switch P1 is closed immediately upon the operation of the relay T1 to close its contact members 25, thereby energizing the actuating coil of the switch P1 through a circuit which may be traced from the contact segment 29, which is engaged by the contact member 30 of the controller TC, through conductor 36, the contact members 25, conductor 37, the actuating coil of the switch P1 and conductor 33 to negative.

The closing of the switch P1 interrupts the energizing circuit for the actuating coil of the switch S by opening the interlock 34, thereby causing the switch S to open. The opening of the switch S establishes an energizing circuit for the actuating coil of the switch P2, which may be traced from the conductor 36 through an interlock 38 on the switch P1, conductor 39, an interlock 41 on the switch S, conductor 42 and the actuating coil of the switch P2 to the negative conductor 33. The closing of the switch P2 completes the transition from series to parallel.

It will be noted that the energizing circuit for the actuating coil of the switch GF is interrupted by the operation of the relay T1 to open its contact members 26. In this manner the switch GF is opened to insert the resistor 22 in the circuit for the field winding 14 of the generator 10, thereby reducing the voltage of the generator during the transition period. Following the completion of the transition, the switch GF is reclosed by the energization of its actuating coil through a circuit which extends from the conductor 32 through an interlock 43 on the switch P2 to conductor 35, thence through the actuating coil of the switch GF to the negative conductor 33. Accordingly, full field excitation is applied to the generator 10 immediately upon the completion of the transition of the motors 11 and 12 from series to parallel-circuit relation.

The reverse transition from parallel to series circuit-relation is automatically effected by the operation of the relay T1 to open its contact members 25 and reclose its contact members 26 upon an increase of the generator current as a result of a decrease in the speed of the locomotive or an overload on the generator. The opening of the contact members 25 of the relay T1 deenergizes the actuating coil of the switch P1, thereby opening this switch.

Following the opening of the switch P1, the switch S is closed by the energization of its actuating coil through the interlock 34 carried by the switch P1. The closing of the switch S interrupts the energizing circuit for the actuating coil of the switch P2 by the opening of the interlock 41 carried by the switch S. It will be noted that the switch P2 remains closed until after the switch S is closed since its actuating coil remains energized through a circuit provided by an interlock 44, which is connected in parallel-circuit relation to the interlock 33 on the switch P1. Therefore, at least one of the motors is always connected across the generator during the transition period and at no time is the tractive effort entirely lost.

From the foregoing description it is apparent that I have provided a system for automatically controlling the transition of electric motors from series to parallel circuit-relation and from parallel back to series-circuit relation, which has several advantages over previously-known systems. Thus, the present system has more desirable operating characteristics since it does not function to cause a reverse transition when the overload on a generator is of a short duration.

Also, adequate generator protection is afforded without over protecting the generator. Furthermore, the system may be readily installed without any increase in cost or complication of circuits as compared with previously-known systems. By utilizing the calibrating resistor, one design of relay may be adapted to a variety of generators.

Since numerous changes may be made in the above-described construction, and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. In a control system, in combination, a plurality of electric motors, a generator for supplying current to the motors, switching means for connecting the motors in series-circuit relation, additional switching means for connecting the motors in parallel-circuit relation, and a relay having its actuating coil connected in parallel-circuit relation to the commutating field winding only of the generator for initiating the transition of the motors from series to parallel-circuit relation and from parallel to series-circuit relation.

2. In a control system, in combination, a plurality of electric motors, a generator for supplying current to the motors, switching means for connecting the motors in series-circuit relation, additional switching means for connecting the motors in parallel-circuit relation, and a relay having its actuating coil connected in parallel-circuit relation to the commutating field winding only of the generator for initiating the transition of the motors from parallel to series-circuit relation.

3. In a control system, in combination, a plurality of electric motors, a generator for supplying current to the motors, a switch for connecting the motors in series-circuit relation, additional switches for connecting the motors in parallel-circuit relation, said switches being separately operable in sequential relation, interlocking means actuated by said switches for controlling the sequence of operation of said switches, and a relay having its actuating coil connected in parallel-circuit relation to the commutating field winding only of the generator and cooperating with said interlocking means to control the transition of the motors from parallel to series-circuit relation.

4. In a control system, in combination, a plurality of electric motors, a generator for supplying current to the motors, a switch for connecting the motors in series-circuit relation, additional switches for connecting the motors in parallel-circuit relation, said switches being separately operable in sequential relation, inter-locking means actuated by said switches for controlling the sequence of operation of said switches, and a relay having its actuating coil connected in parallel-circuit relation to the commutating field winding only of the generator and cooperating with said interlocking means to control the transition of the motors from parallel to and from parallel to series-circuit relation.

5. In a control system, in combination, a plurality of electric motors, a generator for supplying current to the motors, a switch for connecting the motors in series-circuit relation, additional switches for connecting the motors in parallel-circuit relation, said switches being separately operable in sequential relation, interlocking means actuated by said switches for controlling the sequence of operation of said switches, a controller, a relay having its actuating coil connected in parallel-circuit relation to the commutating field winding of the generator and cooperating with said interlocking means and said controller to control the transition of the motors from parallel to series-circuit relation, an additional coil on said relay, and means on said controller for controlling the energization of said additional coil.

6. In a control system, in combination, a plurality of electric motors, a generator for supplying current to the motors, a switch for connecting the motors in series-circuit relation, additional switches for connecting the motors in parallel-circuit relation, said switches being separately operable in sequential relation, interlocking means actuated by said switches for controlling the sequence of operation of said switches, a controller, a relay having its actuating coil connected in parallel-circuit relation to the commutating field winding of the generator and cooperating with said interlocking means and said controller to control the transition of the motors from series to parallel and from parallel to series-circuit relation, an additional coil on said relay, and means on said controller for controlling the energization of said additional coil.

7. In a control system, in combination, a plurality of electric motors, a generator for supplying current to the motors, a switch for connecting the motors in series-circuit relation, additional switches for connecting the motors in parallel-circuit relation, said switches being separately operable in sequential relation, interlocking means actuated by said switches for controlling the sequence of operation of said switches, a controller, a relay having its actuating coil connected in parallel-circuit relation to the commutating field winding of the generator and cooperating with said interlocking means and said controller to control the transition of the motors from series to parallel and from parallel to series-circuit relation, means for calibrating said relay in accordance with the characteristics of the generator, an additional coil on said relay, and means on said controller for controlling the energization of said additional coil.

THELBERT L. WEYBREW.

REFERENCES CITED

The following references are of record in the file of this patent:

UNITED STATES PATENTS

| Number | Name | Date |
| --- | --- | --- |
| 2,264,853 | McNairy | Dec. 2, 1941 |
| 2,330,638 | Stratton | Sept. 28, 1943 |
| 2,383,813 | Ogden | Aug. 28, 1945 |